O. W. HOYT.
Fender.
No. 168,999.
Patented Oct. 19, 1875.
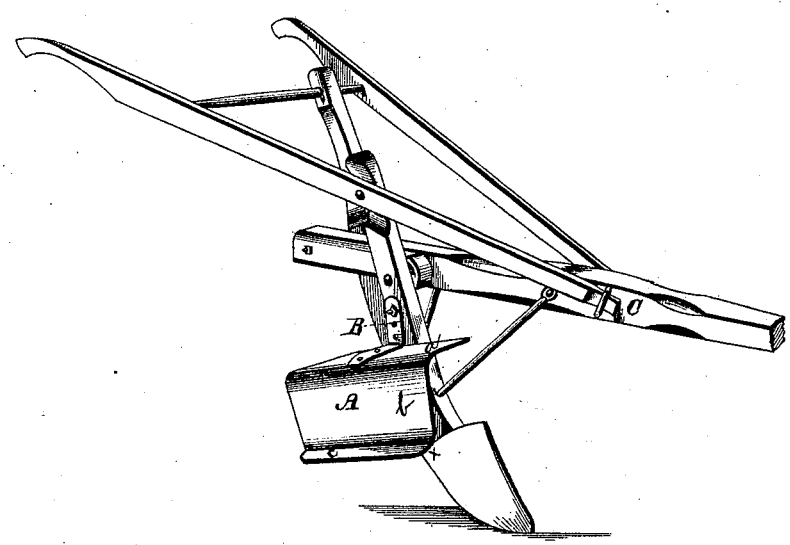
ATTEST:
C H Howell
N P Loveridge
INVENTOR:
Orin W Hoyt

UNITED STATES PATENT OFFICE.

ORIN W. HOYT, OF COLDWATER, MICHIGAN.

IMPROVEMENT IN FENDERS.

Specification forming part of Letters Patent No. 168,999, dated October 19, 1875; application filed June 24, 1875.

*To all whom it may concern:*

Be it known that I, ORIN W. HOYT, of the town of Coldwater, in the county of Branch and State of Michigan, have invented a new and useful machine to be attached to the common shovel and wheel cultivators, and other cultivators in use and to be used in cultivating corn, potatoes, and other crops, and designated by me as the "Cultivator-Shield;" and I do hereby declare that the following is a full, clear, and exact description of the construction and operation of the same, reference being had to the accompanying drawing, showing the shield attached to the common shovel cultivator.

Letter A represents the shield; letter B, the shank by which it is held and secured to the upright post of the cultivator, and letter C the common shovel cultivator. The shield is secured to the standard or upright post of the cultivator by a single bolt passing through the standard from the inside, and through a hole in the shank. There are three of these holes through the shank, in order that the shield may be raised or let down, as may be required for shallow or deep cultivation.

The shield is constructed as follows, viz: By taking a block of No. 16 charcoal sheet-iron, about twelve by fourteen inches, and crimping the same, so that the part $a$, attached at right angles to the shank, makes a surface of about fourteen inches long by five and a half broad, and the part $b$, bent over from that part, and at right angles to it, is of the same dimensions, and the remainder $c$ is bent so as to form a flange at an angle of about forty-five degrees with the portion $b$ last mentioned. The front corner $x$ of the flange is rounded off, and a small portion of the part $b$ next thereto. The shank is secured to the horizontal surface $a$ by two rivets.

The advantages of the use of the shield with the cultivator are as follows, viz: First, it prevents the young plants from being covered by the soil thrown up by the cultivator, and this is the primary object of the shield; second, the flange runs, or may be run, under the leaf of the plant and the soil by an easy movement of the cultivator, and the action of the shield is thrown or left at the roots of the plants in uniform quantities; and, third, it constitutes a constant gage by which to determine the distance the cultivator should be run from the plants.

I claim as my invention—

The fender A, formed of a single piece of metal, bent into three angles, $a$, $b$, and $c$, as shown and described, and adjustably connected to the plow-standard by the angular shank B and bolt, as set forth.

ORIN W. HOYT.

Witnesses:
C. H. HOWELL,
N. P. LOVERIDGE.